H. J. SCHMICK.
ART OF AND APPARATUS FOR FORMING GEAR TEETH AND THE LIKE.
APPLICATION FILED APR. 29, 1920.

1,384,542.

Patented July 12, 1921.

INVENTOR.
Henry J. Schmick,
BY
Emery Booth Janney & Varney
HIS ATTORNEYS

H. J. SCHMICK.
ART OF AND APPARATUS FOR FORMING GEAR TEETH AND THE LIKE.
APPLICATION FILED APR. 29, 1920.
1,384,542.
Patented July 12, 1921.
2 SHEETS—SHEET 2.
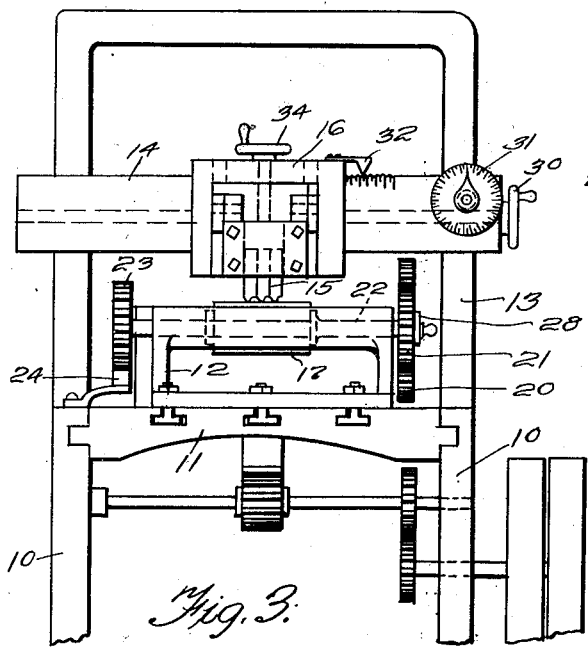
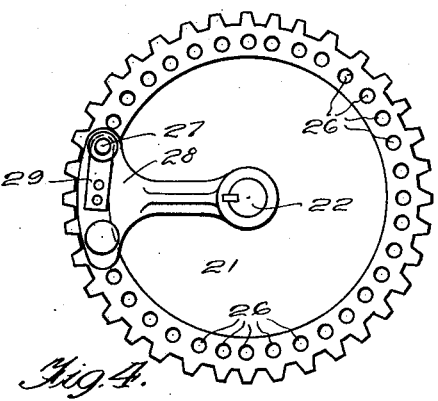
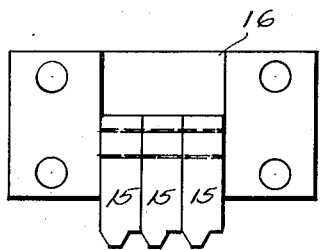
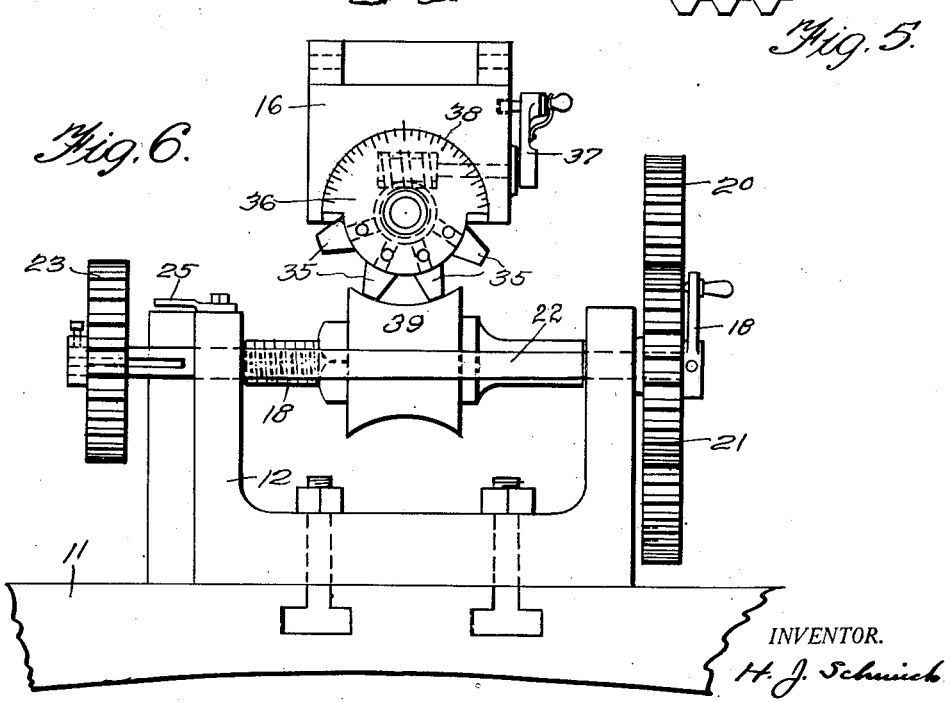
INVENTOR.
H. J. Schmick
BY
Emery, Booth, Janney + Varney
HIS ATTORNEYS.

UNITED STATES PATENT OFFICE.

HENRY J. SCHMICK, OF WILLIAMSPORT, PENNSYLVANIA, ASSIGNOR TO SCHMICK SCREW AND GEAR COMPANY, OF WILMINGTON, DELAWARE, A CORPORATION OF DELAWARE.

ART OF AND APPARATUS FOR FORMING GEAR-TEETH AND THE LIKE.

1,384,542. Specification of Letters Patent. Patented July 12, 1921.

Application filed April 29, 1920. Serial No. 377,638.

*To all whom it may concern:*

Be it known that I, HENRY J. SCHMICK, a citizen of the United States, and a resident of Williamsport, in the county of Lycoming and State of Pennsylvania, have invented an Improvement in the Art of and Apparatus for Forming Gear-Teeth and the like, of which the following description, in connection with the accompanying drawings, is a specification, like characters on the drawings representing like parts.

This invention aims to provide a new and improved method and apparatus for forming gear teeth, cam grooves and other shaped surfaces.

In the accompanying drawings I have shown one form of apparatus illustrating and for practising my invention, but without limiting my invention thereto, nor to apparatus for making the particular articles shown.

In the drawings, Figure 1 is a side elevation of a machine for forming gear teeth, cam grooves, and the like, according to the invention;

Fig. 3 is an end view of the same;

Fig. 4 is a face view of an index mechanism drawn to a larger scale;

Fig. 5 is a front view of a gang of cutters; and

Fig. 6 is a view of the tool carrier slide fitted with a rotary tool holder and cutting tools, and mechanism for rotating the tool holder intermittently.

Figure 1:
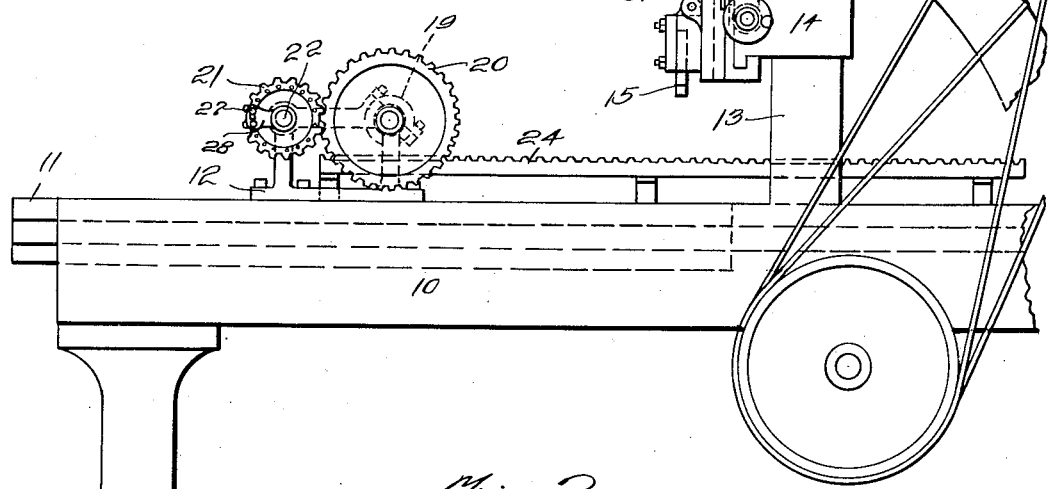
Figure 2:
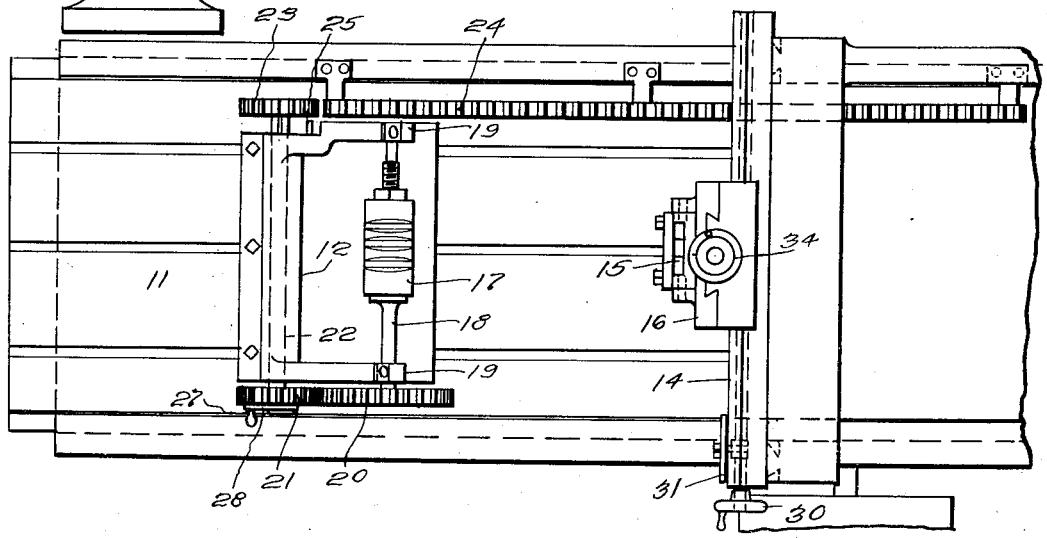
Fig. 2 is a plan view of the same, showing a work blank partly cut in the machine.

The machine illustrated in the drawings comprises a horizontal frame 10 which has ways on each side for the sliding table 11 upon which the work carrying frame 12 is mounted. The table is reciprocated by suitable power driven reversing gearing back and forth between the side posts 13 under the vertically adjustable cross-rail 14 upon which the cutting tool 15 is mounted on an adjustable slide 16.

The work blank 17 is clamped on an arbor 18 which is journaled in the frame 12 to turn on an axis transverse to the direction of movement of the frame, and is removable therefrom to change work by taking off the bearing caps 19. The work arbor 18 has a gear 20 fixed on one end that meshes with a gear 21 loosely journaled on a shaft 22 which is mounted in the frame 12 and has a gear 23 splined on its other end.

The splined gear 23 can be slipped axially on the shaft 22 to engage the rack 24, which is mounted on the side of the machine frame 10 and extends alongside of the path of movement of the table, whereby the splined gear 23 will be rotated in one direction as the table moves to carry the work toward the cutters and in the opposite direction as the table returns. The splined gear 23 can be slipped out of mesh with the rack and into engagement with a stud 25 on the frame 12 to hold it stationary.

The loose gear 21 on the shaft 22 is provided with a circular series of equally spaced holes 26, in which a pin 27 carried by an arm 28 fixed on the end of the shaft 22 is arranged to fit for connecting the loose gear to the shaft. The pin 27 is normally held in engagement with one of the holes 26 by means of the spring 29 (see Fig. 4).

The cross-slide 16 is adjustable on the rail 14 by means of a screw turned by a hand wheel 30. For fine adjustment of the cross-slide a micrometer screw mechanism comprising a pointer and dial 31 is provided. A pointer 32 and scale marked on the cross-rail serve to indicate the relative position of the cutter lengthwise with respect to the axis of the work blank. A vertical adjusting screw 34 serves to raise and lower the cutter for determining the depth of cut.

In the operation of the machine, prior to each cut, the work blank arbor is rotated through a small arc by withdrawing the pin 27 from its hole and setting it in the next hole of the series 26; and the cutter 15 is likewise spaced sidewise (lengthwise of the axis of the work blank) by turning the handwheel 30 or micrometer screw 31. The effect of thus operating the machine is a groove consisting of a series of cuts, each displaced circumferentially and axially of the work blank with reference to adjoining cuts.

If the gear 23 is in position to engage the rack 24, the motion of the frame 12 and work blank toward the cutter causes the arbor to rotate away from the cutter, thereby making a cut having a concave bottom in the periphery of the work blank transverse to its axis; but if the gear 23 is in engagement with the stud 25, the arbor is held against rotation and the resulting cut is straight throughout its bottom. If the rack 24 is inverted to engage above the gear 23, instead of below it, the resulting cut will be convex across its bottom. The shape of the bottom of the cut should be adapted to the work.

Instead of the series of straight tooth cutters 15 (as shown in Fig. 5) for cutting a straight gear, worm, or cam, the cutters 35 may be separately mounted radially in a circular arc on a pivoted cutter block 36 and rotated intermittently through a suitable angle between successive cuts by means of the indexing device 37 and vernier scale 38 (as shown in Fig. 6). The form of work blank 39 shown in Fig. 6 may thereby be cut.

The frame 12 may be mounted on a milling machine or shaper table, instead of the planer table, illustrated in the drawings, and the machine operated as described above with the gear 23 in engagement with the stud 25.

It is evident that, although the invention is herein described as embodied in a particular form of apparatus, and in the methods which may be performed with the aid of such apparatus, other methods and apparatus can be adapted to the purposes of the invention.

I claim the following as my invention:

1. The art of forming gear teeth, cam grooves, and the like, by moving the blank to be formed transversely of its axis of rotation in a straight line path toward the cutter and rotating it on its axis at a fixed ratio of angular velocity with reference to the speed of movement toward the cutter.

2. The art of forming gear teeth, cam grooves, and the like, by moving the blank to be formed transversely of its axis of rotation in a straight line path toward the cutter and rotating it on its axis at a fixed ratio of angular velocity with reference to the speed of movement toward the cutter, and changing the relative axial and angular position of the work blank with reference to the cutter between successive cuts in equal proportion.

3. The art of forming gear teeth, cam grooves, and the like upon a work blank having a principal axis of rotation, by causing relative movement of approach in a straight line path of the work blank and the cutter and maintaining the axis of the work blank at right angles to said path of movement.

4. Apparatus for forming gear teeth, cam grooves, and the like, comprising an arbor for holding the blank to be formed, a support for said arbor, means for moving said support in a straight line transversely of the axis of said arbor, means for holding a cutter in the path of movement of said blank, and means carried by said support for rotating said arbor and controlling its angular position with reference to the cutter.

5. Apparatus for forming gear teeth, cam grooves, and the like, comprising an arbor for holding the blank to be formed, a support for said arbor, means for moving said support in a straight line transversely of the axis of said arbor, means for holding a cutter in the path of movement of said blank, and means carried by said support for rotating said arbor and controlling its angular position with reference to the cutter, said means comprising a shaft, gears connecting said arbor and shaft, and a gear on said shaft adapted to mesh with a rack fixed alongside the path of movement of said support.

6. Apparatus for forming gear teeth, cam grooves, and the like, comprising an arbor for holding the blank to be formed, a support for said arbor, means for moving said support in a straight line transversely of the axis of said arbor, means for holding a cutter in the path of movement of said blank, and means carried by said support for rotating said arbor and controlling its angular position with reference to the cutter, said means comprising a shaft, gears connecting said arbor and shaft, indexing mechanism associated with one of said gears, and a gear on said shaft adapted to mesh with a rack fixed alongside the path of movement of said support.

7. Unitary means for forming gear teeth, cam grooves, and the like, comprising a frame 12 carrying a removable arbor 18 for a work blank, and a shaft 22, gears 20 and 21 connecting said arbor and shaft, one of said gears having means for varying its angular position upon its shaft, and a gear 23 on said shaft adapted to coöperate selectively with means carried by said frame and with external means for determining the angular position of said shaft in all positions of said frame.

8. Unitary means for forming gear teeth, cam grooves, and the like, comprising a frame 12 carrying an arbor 18 for a work blank, and a shaft 22, gears 20 and 21 connecting said arbor and shaft, one of said gears having a series of holes 26 spaced around it, an arm 28 mounted to turn about the axis of said gear and carrying a pin 27 adapted to engage said holes selectively, and means carried by said frame and operatable at will for holding said arm in fixed angular position in all positions of said frame.

9. A work holding fixture for gear generating apparatus and the like comprising an arbor adapted to receive and hold the work blank, a supporting frame wherein said arbor is journaled, an index plate operatively connected to said arbor, a shaft having means for turning said index plate, means for controlling the position of said index plate with reference to said shaft, and means including a gear splined on said shaft and adapted to be moved axially thereon to engage a fixed detent on said frame to hold said shaft against rotation.

10. In combination with a movable support and relatively fixed cutter, a work holding fixture carried by said support comprising an arbor having a clamping device adapted to receive and hold the work blank and a frame arranged transversely of the path of movement of said support wherein said arbor is removably journaled, an index device rotatably mounted in said frame and operatively connected to said arbor, and means for controlling the position of said index device during movement of said support and frame.

11. In combination with a relatively movable support and cutter, a work holding fixture mounted on said support comprising an arbor having a clamping device adapted to receive and hold the work blank, a frame wherein said arbor is journaled transversely to the path of relative movement of said support and cutter, an index plate operatively connected to said arbor, a positioning member carried by said frame having means for turning said index plate, means for controlling the relative position of said cutter transversely of the path of relative movement, and means for controlling the position of said positioning member with reference to said index plate.

In testimony whereof I have signed my name to this specification.

HENRY J. SCHMICK.